US010740807B2

(12) United States Patent
Gandhi

(10) Patent No.: US 10,740,807 B2
(45) Date of Patent: Aug. 11, 2020

(54) SYSTEMS AND METHODS FOR TRANSMISSION OF REPRESENTATIONAL IMAGE-BASED OFFERS BASED ON A TACTILE INPUT

(71) Applicant: PAYPAL, INC., San Jose, CA (US)

(72) Inventor: Saumil Ashvin Gandhi, Sunnyvale, CA (US)

(73) Assignee: PAYPAL, INC., San Jose, CA (US)

( * ) Notice: Subject to any disclaimer, the term of this patent is extended or adjusted under 35 U.S.C. 154(b) by 729 days.

(21) Appl. No.: 14/920,506

(22) Filed: Oct. 22, 2015

(65) Prior Publication Data

US 2016/0042417 A1 Feb. 11, 2016

Related U.S. Application Data

(63) Continuation of application No. 12/892,234, filed on Sep. 28, 2010, now abandoned.

(51) Int. Cl.
*G06Q 20/00* (2012.01)
*G06Q 30/06* (2012.01)
(Continued)

(52) U.S. Cl.
CPC ......... *G06Q 30/0611* (2013.01); *G06Q 20/40* (2013.01); *G06Q 30/02* (2013.01); *G06Q 30/04* (2013.01); *G06Q 30/0643* (2013.01)

(58) Field of Classification Search
CPC .. G06Q 20/06; G06Q 20/0655; G06Q 20/108; G06Q 20/405; G06Q 20/381; G06F 3/017; H04M 2250/64; H04W 4/80
See application file for complete search history.

(56) References Cited

U.S. PATENT DOCUMENTS

2007/0064004 A1 3/2007 Bonner et al.
2008/0152263 A1* 6/2008 Harrison ............... G06F 1/1626
382/313
(Continued)

FOREIGN PATENT DOCUMENTS

EP 0921475 * 6/1999
EP 1595583 * 11/2005

OTHER PUBLICATIONS

International Searching Authority—U.S. Patent & Trademark Office, PCT Notification of Transmittal of the International Search Report and the Written Opinion of the International Searching Authority, or the Declaration dated Jan. 31, 2012, for PCT Application No. PCT/US2011/051453, 8 pages, Alexandria, Virginia.
(Continued)

*Primary Examiner* — Abhishek Vyas
(74) *Attorney, Agent, or Firm* — Haynes and Boone, LLP

(57) ABSTRACT

Provided herein are systems and methods for transmitting an offer between users based on an interaction of a first user with an image representing a good/service to be offered. A user device system includes a list of potential recipients and a list of items and one or more hardware processors. The system receives a selection of one or more of the potential recipients as displayed on a display of the system. The system displays images representing at least some of the list of items that the first user can offer to a second user. The system processes an input received on the display in connection with a first image of the set of images as a request by the first user to offer the item represented by the first image to the second user and then transmits the request to the transaction service provider system over a network.

20 Claims, 11 Drawing Sheets

(51) Int. Cl.
*G06Q 20/40* (2012.01)
*G06Q 30/04* (2012.01)
*G06Q 30/02* (2012.01)

(56) References Cited

U.S. PATENT DOCUMENTS

2010/0042535 A1\* 2/2010 Stone .................. G06Q 20/10
705/39
2011/0106675 A1\* 5/2011 Perlman ................ G06Q 20/02
705/30
2011/0163944 A1 7/2011 Bilbrey et al.
2011/0282785 A1\* 11/2011 Chin .................. G06F 3/04883
705/42

OTHER PUBLICATIONS

Canadian Intellectual Property Office, First Examination Report dated Jun. 14, 2017, for Canadian Patent Application No. 2,812,444.

\* cited by examiner

Virtual Money Pool

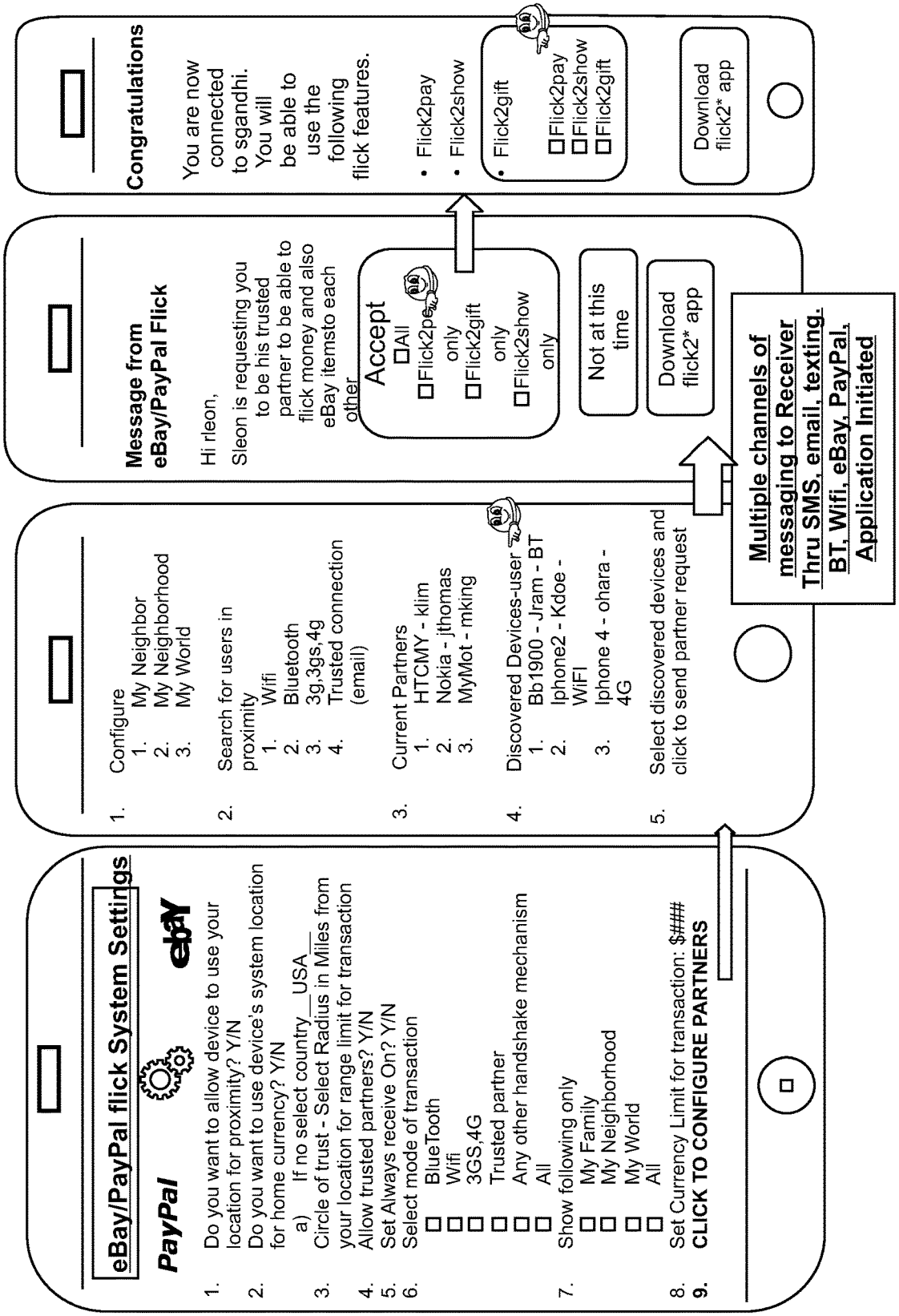

SYSTEMS AND METHODS FOR TRANSMISSION OF REPRESENTATIONAL IMAGE-BASED OFFERS BASED ON A TACTILE INPUT

PRIORITY INFORMATION

The present application is a continuation of application Ser. No. 12/892,234, filed on Sep. 28, 2010, entitled "TRANSACTIONS BY FLICKING," which is incorporated by reference herein in its entirety.

BACKGROUND

Field of the Invention

The present invention generally relates to conducting electronic transactions, and in particular, to ways of sending and receiving items via user devices.

Related Art

More and more consumers are purchasing items and services over electronic networks, such as the Internet. Consumers routinely search for and purchase products and services from merchants and individuals alike. The transactions can take place directly between an on-line merchant or retailer and the consumer, where payment is typically made by entering credit card or other financial information. Transactions can also take place with the aid of an on-line payment provider, such as PayPal, Inc. of San Jose, Calif. Such payment providers can make transactions easier and safer for the parties. Payment providers enable payments to be made through many different convenient methods.

Electronic transactions need not be financial or with a merchant. With the increasing use of mobile devices, users can now pay or transfer money to other users, as well as share items, such as through emails or texts. However, mobile devices typically have relatively small screens, making such transactions difficult and not very enjoyable. For example, a user may have difficulty or find it boring to enter information and select boxes or links to process an information transfer or transaction to another user or merchant.

Thus, there is a need for uses to have a more enjoyable and easier process of conducing electronic transactions.

SUMMARY

In accordance with different embodiments, a user performs a flicking motion on a user device to send an item to a recipient, where the item then appears on the recipient device. The item may be currency (real such as coins and/or bills or virtual) or products. The flicking may transfer funds to the recipient, request a payment from the recipient, offer a product to the recipient, or other actions. Once received, the recipient may accept the payment, send a payment, or purchase a product. Depending on the recipient action, this may also be performed with a swiping motion on the recipient device. The user may designate certain recipients as "trusted" so that a reduced authorization is needed to complete transactions between trusted parties.

In one embodiment, with money transfers, the user flicks various coins and/or bills displayed on the user device to one or more selected recipients. The money is shown moving out of the user device. This can be through NFC or other communication means such as WiFi or cellular networks. The recipient(s) sees money coming into the recipient device, with a total amount received. The recipient(s) can confirm the receipt and receive the money in a recipient account. If the user was requesting payment, the recipient(s) can confirm or authorize the payment, which credits the user account and debits the recipient account. The currency shown on either device can be set by the user and/or recipient(s) or be based on the location or registration of either device. The currency can be real for real money transfers or virtual for virtual currency transfers, such as with on-line gaming and other activities.

In another embodiment, the user flicks an item displayed on the user device to one or more selected recipients. The item is shown moving out of the user device and into the recipient device. The recipient can then purchase the item from the recipient device, such as through a normal payment process or by flicking the proper amount of money to the seller. For the latter, the flicking can be similar to a money transfer in the above embodiment.

Once money is sent or received, in different embodiments, a corresponding sound may be heard. For example, if coins are sent, the sound of coins may be heard. If bills are sent, the sound of paper may be heard. When money is received, the sound of a cash register may be heard. Users may select specific sounds for different actions or may create specific sounds, such as a voice message.

Virtually, anything displayed on a user device can be flicked to a recipient. Examples include contacts, digital goods, calendar events, photos, videos, etc.

As a result, both the user and recipient are provided with a unique and fun experience for performing financial and other electronic transactions or data transfers. With trusted parties, the process becomes even simpler.

These and other features and advantages of the present invention will be more readily apparent from the detailed description of the embodiments set forth below taken in conjunction with the accompanying drawings.

BRIEF DESCRIPTION OF THE FIGURES

FIGS. 3A to 12 are exemplary screen shots showing displays a user and/or recipient may see during a transaction performed by flicking according to another embodiment;

Figure 1:
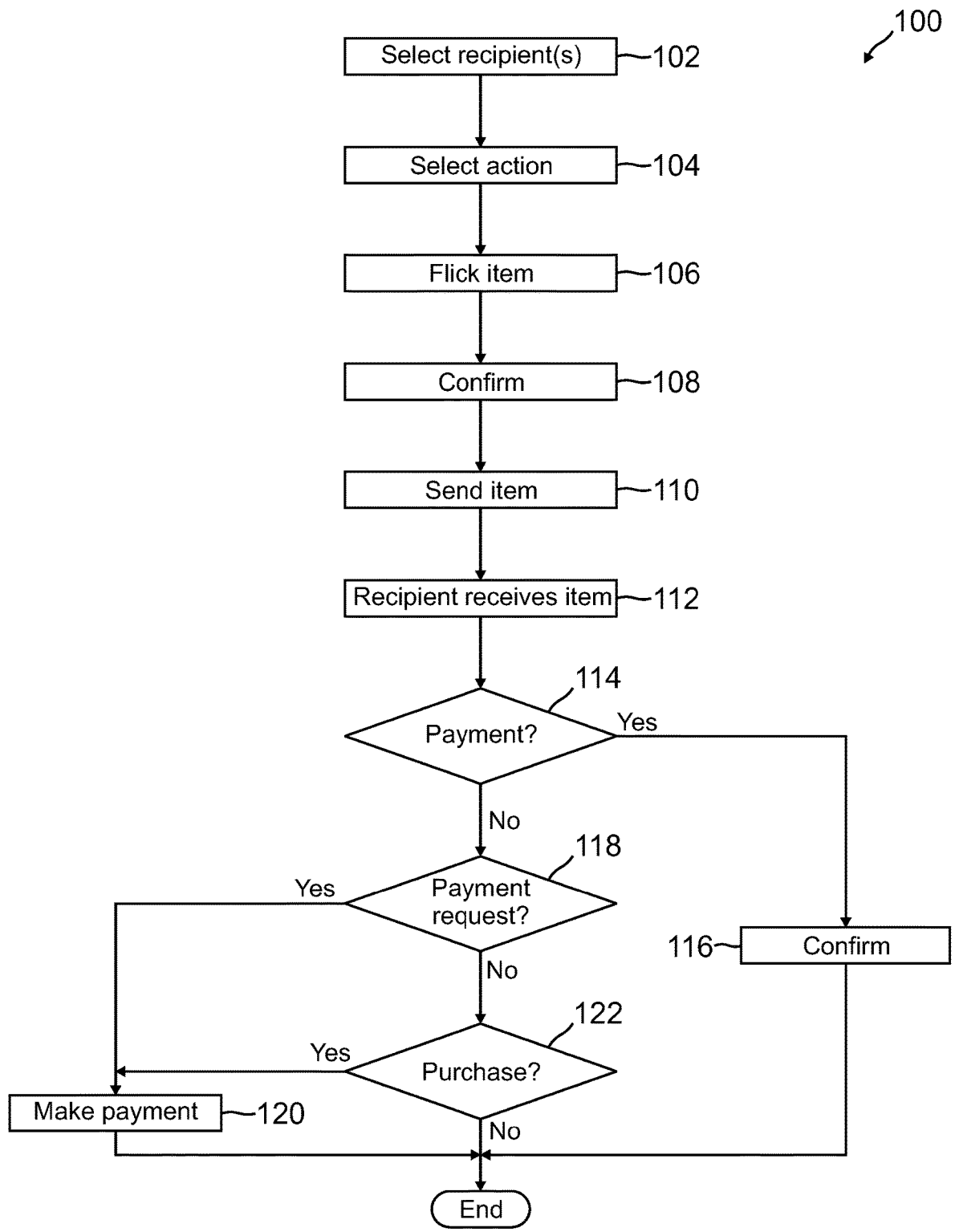
FIG. 1 is a flowchart showing a process where transactions are performed by flicking according to one embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

FIG. 1 is a flowchart 100 showing a process where transactions are performed by flicking according to one embodiment. At step 102, a sender or user selects an intended recipient from a user device. The user device may be a smart phone, PC, or other computing device capable of communication, such as to another device, a merchant, or a service provider, such as a payment provider, on-line merchant, or on-line marketplace. Selection can be through any suitable means. For example, the recipient may be selected as the person the user device is currently communicating with, such as on a phone call. In another example, the user selects an intended recipient from a list of recipients. The list may be created by the user or determined by the service provider. For a user-created list, the user may have family members, friends, select merchants, or any or all contacts of the user. For a list determined by the service provider, the list may include only recipients within a certain distance to the user, where the distance may be set by the user.

At step 104, the user selects a type of action. In one embodiment, the action is to send money. Examples of other actions include, but are not limited to, request a payment, send a gift, send an offering or item, transfer virtual currency, send a contact, send a photo, send a video, send an app, etc. The action may be selected by the user selecting from a list of actions, such as by tapping on or checking the desired action.

Depending on the type of action, the user is then presented with items. For example, if the user is making or requesting a payment, the user may be presented with currency. The type of currency may be determined in different ways, such as the user selecting the default currency, which the user can change transaction to transaction, or the device or service provider determining the currency by the location the user or device registration address. Assuming the type of currency is for the United States, the user may see a penny, a nickel, a dime, a quarter, a dollar bill, a five dollar bill, a ten dollar bill, a twenty dollar bill, a fifty dollar bill, and a hundred dollar bill on the user device display.

If the user is sending a gift or an item for possible purchase, the user may be presented with one or more such items. For example, the user may be shown a list, with or without pictures or additional description.

If the user is transferring virtual currency, the user may be presented with a list of possible virtual currencies for selection. This may depend on what the user has previously selected or on what games or other activities the user has been engaged with.

Once the item(s) are presented, the user flicks the desired item(s) at step 106. For example, the user may place a finger, cursor, mouse, or the like, on a desired item and then move the item with a flicking motion. Other motions may also be suitable. When the item is flicked, the user may see the item moving out of the user device or other visual representation of moving the item. Examples include the item fading away or simply disappearing from the display. Using the money transfer example, if the user wishes to transfer $5.25, the user may flick a five dollar bill and a quarter, which are then shown moving out of the device. In different embodiments, steps 102, 104, and 106 can be performed in any order and/or combined.

After the user is finished selecting item(s) to move, the user may be asked to confirm the selection, at step 108, before the items are actually communicated to the recipient. This may simply entail the user selecting a button or link indicating "confirm," "send," or the like. In one embodiment, if the recipient is "trusted," this confirmation step may be skipped. "Trusted" recipients will be discussed in detail below, but are generally recipients the user trusts or has designated as trusted parties.

Next, at step 110, if confirmed, the selected items are sent from the user device to the recipient device. Communication may be through any suitable means, including, but not limited to, Bluetooth, WiFi, 3GS, and 4G.

In one embodiment, one or more sounds may accompany step 106 or 110. Sounds may be selected by the user or by a service provider. For example, if money is being sent, coins being flicked or sent may be accompanied with a sound of coins jingling and bills being flicked or sent may be accompanied with a sound of bills rustling. The user may also customize a sound, such as by selecting from a list of sounds, creating or downloading a sound, or creating a voice message.

The recipient then receives the selected items, at step 112, on a recipient device. In one embodiment, the device is a smart phone, but can be other computing/transmitting devices, such as a PC. The recipient may then see the items on the device display, such as the item moving onto the device, suddenly appearing, fading in, etc.

In different embodiments, items being received on the recipient device may be accompanied with a sound, which can be selected by the recipient or service provider. For example, when the recipient receives money, a cash register sound or slot machine sound may be heard.

When the recipient sees (and/or hears) the items arriving, the recipient determines the reason. For example, at step 114, the recipient determines whether a payment or money transfer is being received. This may be indicated by a visual or audio message, which may indicate the identity of the sender. The recipient can then confirm or authorize receipt of the payment at step 116. The recipient may select a button or link indicating "Accept Money" or the like to confirm. Once confirmed, the service provider processes the payment, such as by debiting an account of the user/sender and crediting an account of the recipient.

If the items sent do not indicate a payment, the recipient determines whether it is for a payment request at step 118. A payment request may be the user requesting the recipient send a payment, such as a child asking a parent for money, a friend asking another friend for a loan or repayment of a loan, etc. If such a payment request, the recipient can make the payment at step 120. This may be done in any number of ways. For example, the recipient may flick money, approve the payment request, enter a payment amount, etc., after logging into a service provider site.

If the items sent do not indicate a payment or payment request, a determination is made at step 122 whether the recipient is asked to or wants to make a purchase. If yes, the recipient may go through a normal payment process to purchase the item or simply select the item to be taken through a payment process.

Note that the actions in steps 114, 118, and 122 are not exhaustive, but just exemplary. There may be other actions, such as sending virtual currency, contacts, photos, etc., which may require different levels of confirmation, including no confirmation. In addition, the determination steps 114, 118, and 122 need not be in succession or any particular order. For example, the recipient may only need to make a single determination based on the received item.

Any or all flicked items, sent or received, may be stored for future use. For example, the user may access an area that contains all flicked items, along with information about the flicked items, such as recipient(s). The area may be visually represented as a box or container. This allows the user to repeat previously flicked items or group individual flicked items into a group folder so that the user can flick the contents of the folder in one action. This "container" may also include an area where flicked items were not completed, e.g., not received or sent. This may be due to an interruption in communication, failure to establish a trust relationship, or other reasons. The user may then access this area to send unsent or unreceived items.

Figure 2:
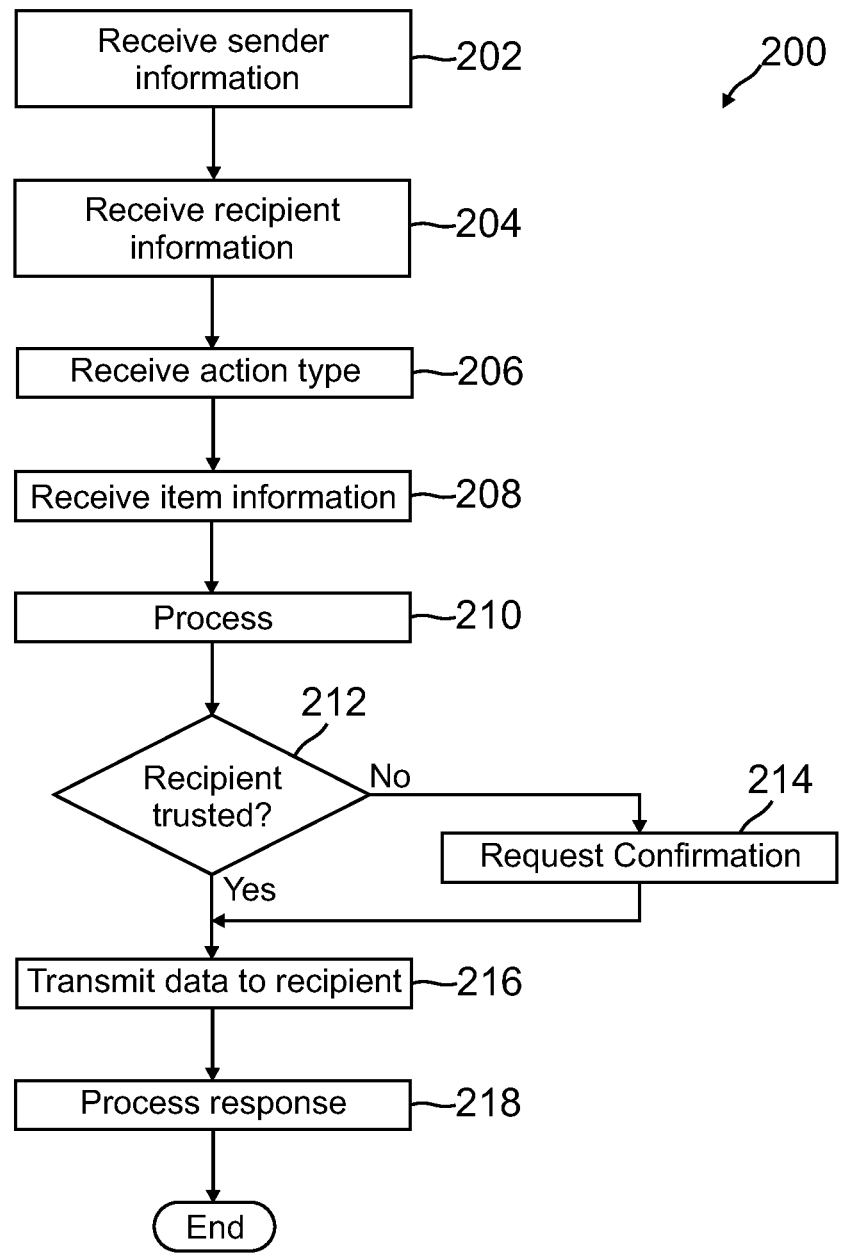
FIG. 2 is a flowchart showing a process for a service provider in handling a transaction performed by flicking according to one embodiment.

FIG. 2 is a flowchart 200 showing a process for a service provider in handling a transaction performed by flicking according to one embodiment. At step 202, the service provider receives information about the user or sender. This may be conveyed when the user is logged into the service provider site or when the user sends the item to a recipient. This information is communicated to the service provider, where the information may include a phone number of the user device or other device ID, a cookie, IP address, etc. that uniquely identifies the user to the service provider. Other types of identification may be suitable, depending on the method of authentication.

At step 204, the service provider receives information about the recipient. This may be conveyed within the transmission of step 202 when the user sends the selected item or items or separately when the user selects a desired recipient. Recipient information may be an email address, a phone number of the recipient device, an account number, or other identifier that uniquely identifies the recipient to the service provider.

At step 206, the service provider receives information about the type of action the user is desiring. For example, as discussed above, the action may be a money transfer, a request for payment, information or data transfer, a request for purchase, etc. This step may be combined with step 202 and/or 204 or may be separate, such as when the user selects an action from the user device.

At step 208, the service provider receives information about the item(s) being sent to the recipient. Again, this may be combined with any or all of the steps above. In one example, when the user flicks a five dollar bill image, the service provider receives information allowing it to know that the user intends to transfer or pay the recipient $5. At step 206 or step 208, the service provider may also determine the type of currency, such as set by the user, the country location of user device registration, etc.

After the necessary information is received, the service provider processes the information at step 210. This may include determining whether the user and/or recipient have an account with the service provider, whether there is sufficient information to process the action, identifying accounts of the user and/or recipient, identifying item and/or seller information, and/or anything needed to process the action.

One determination, made at step 212, may be whether the recipient is trusted, as will be discussed in more detail below. If the recipient is not trusted, the service provider may request confirmation from the user and/or the recipient at step 214. The trust determination may also be whether the user is trusted by the recipient.

If the trust requirement is satisfied or one or both parties confirms the action, the service provider transmits the item and any other data to the recipient device at step 216. If sound is associated with the communication, the service provider determines the appropriate sound to accompany the transmission. As a result of the transmission, the recipient device sees the intended action from the user, such as a payment, a payment request, a purchase request, a gift, a photo, etc. Not all actions require a response. For example, a photo transmission between two trusted parties may not require any response from the recipient.

However, there may be actions that do require a response from the recipient. If the user is requesting a payment or asking the recipient to purchase an item, the service provider may then wait for a response from the recipient. The response may be an authorization of payment, an authorization of receipt of the item, a payment request to the service provider for purchase of the item, etc.

When a response is needed and is received, the service provider processes the response at step 218. The processing depends on the action and the response (if needed). For example, the service provider may process a payment from the user to the recipient, a payment from the recipient to the user (e.g., in response to a payment request from the user or a purchase offer from the user), a transfer of virtual currency, etc. A notification may also be sent if the process is completed, denied, or not completed for any number of reasons.

Figure 3A:
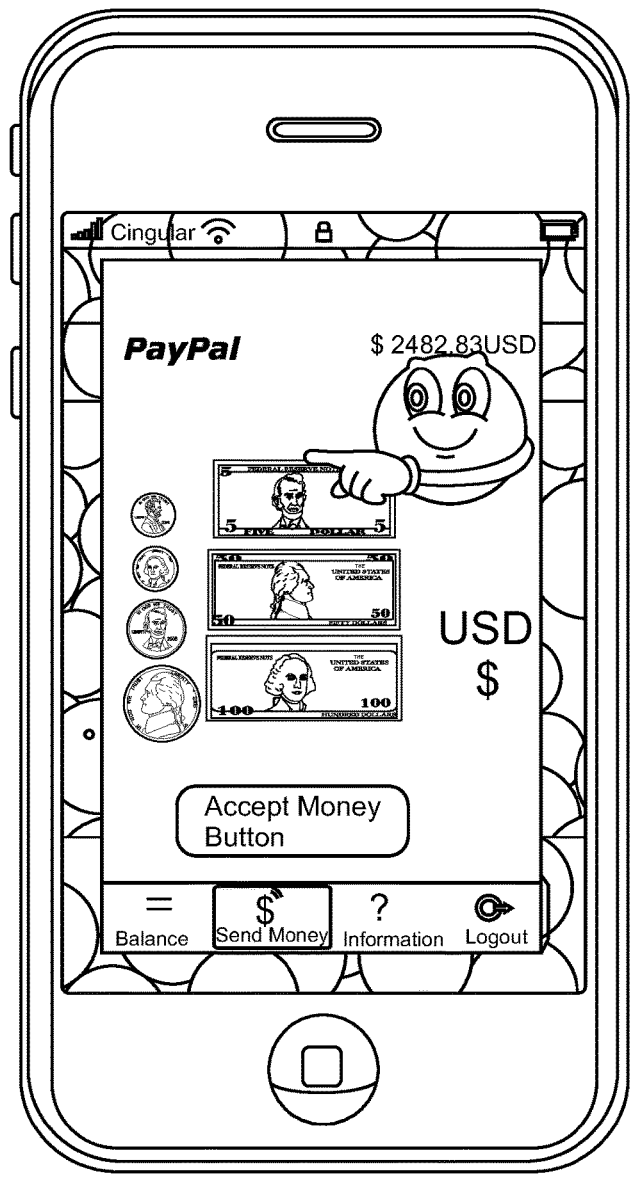

FIGS. 3A to 11D are exemplary screen shots a user or a recipient sees on a device during a transaction by flicking, according to one embodiment. FIG. 3A shows a display on a user smart phone for sending money to the recipient. The service is hosted by a payment provider, in this case, PayPal, Inc. of San Jose, Calif. In FIG. 3A, the user sees different coins and bills in U.S. dollars. The user also sees a current balance in the user account with the payment provider. For more coins or bills not shown on the screen, the user may scroll up or down, such as using a finger, to reveal additional coins or bills. The user is able to select or flick any number of coins or bills shown. Note that the animated pointer is not typically part of the display, but is included to illustrate selection and flicking of items.

Figure 3B:

FIG. 3B shows a display for sending a product listing to a recipient. In this case, the service is hosted by a marketplace site, such as eBay, Inc. of San Jose, Calif. Here, the user sees two items the user has won on the marketplace site. The user is able to select individual items or the entire listing, such as by flicking.

Figure 4:
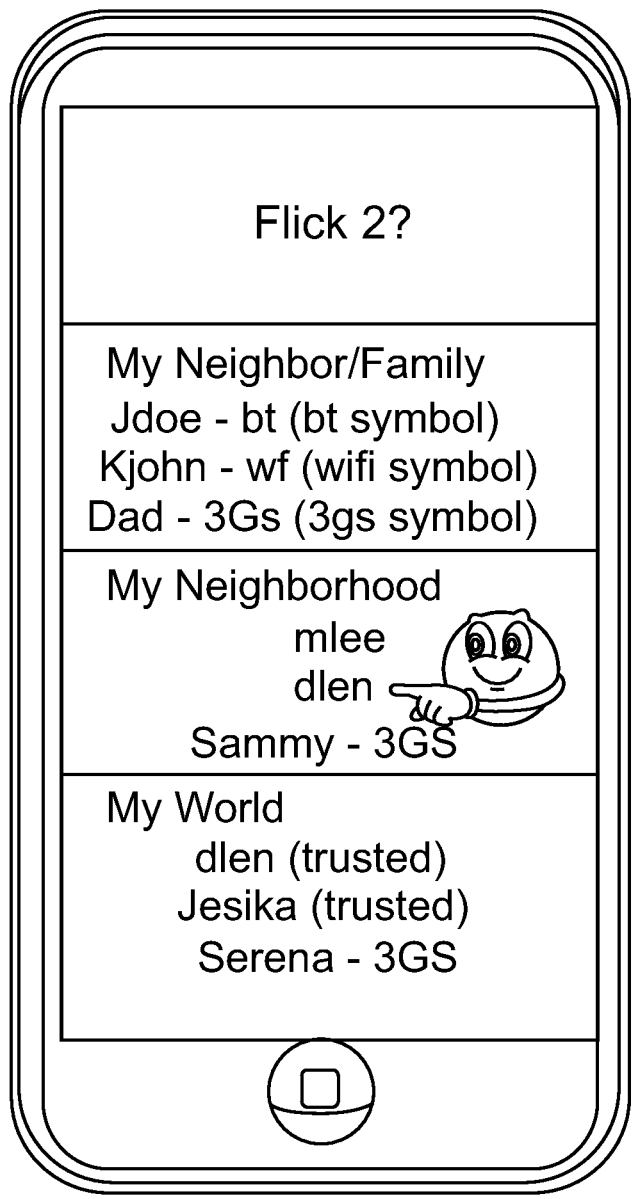

FIG. 4 shows a display asking the reader to identify the intended recipient. In this example, the list of possible intended recipients is divided into three categories. The Neighbor or Family category lists recipients that are trusted by the user, such as family members, friends, regular sellers/buyers, etc. The Neighborhood category lists trusted contacts within a certain radius or distance from the user, where the distance can be set by the user or payment provider. The World category lists user contacts that are known to the user. These categories can be defined differently as well. There may also be different numbers and/or types of categories. Additional information can be added next to each contact or potential recipient, such as whether the contact is trusted and the type of connection between the user and the contact. The user can select the desired recipient by simply tapping or clicking on that contact.

Figure 5:
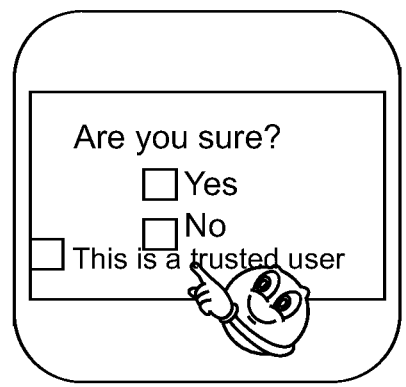

FIG. 5 shows a display that gives the user a chance to confirm or cancel the action or items selected earlier. The display can be separate or overlaid over a previous screen. In one embodiment, the display is not presented if the user had selected a trusted recipient. The display also allows the user to designate the selected recipient as trusted.

Figure 6A:
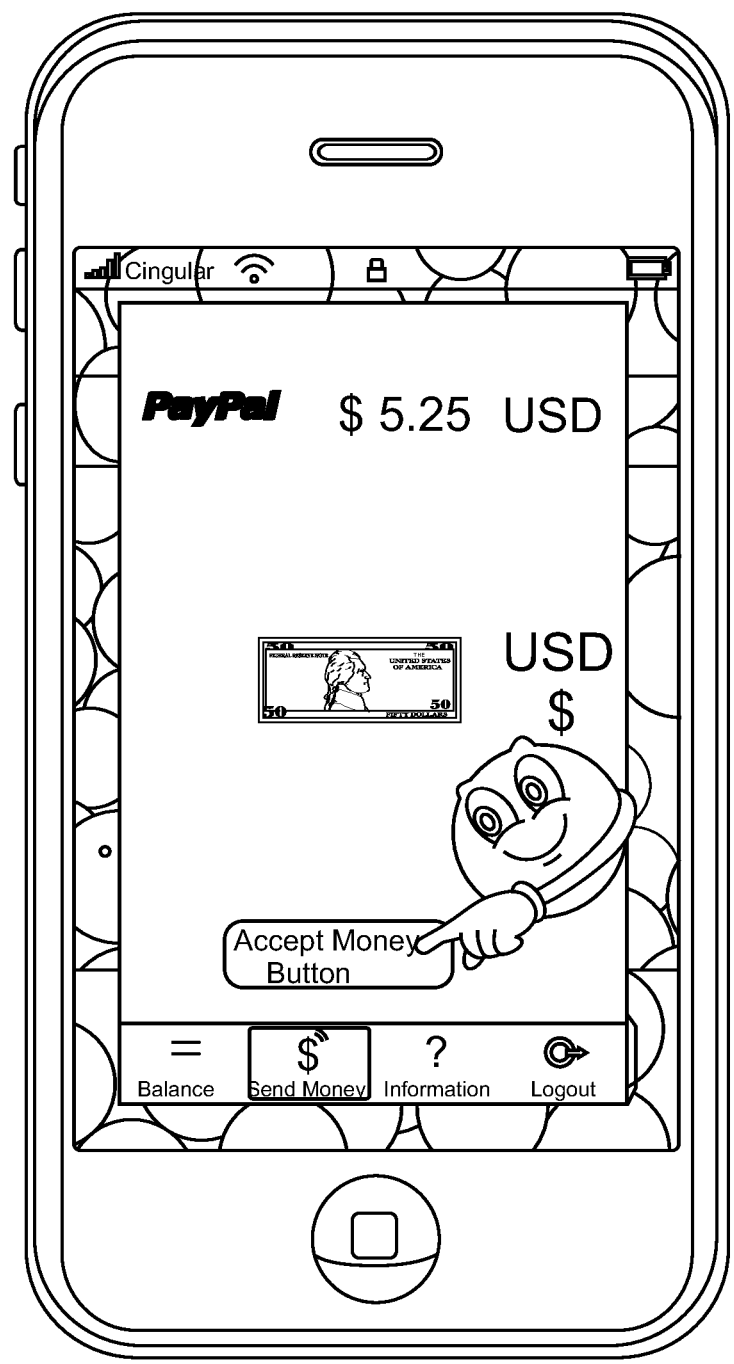
Figure 6B:
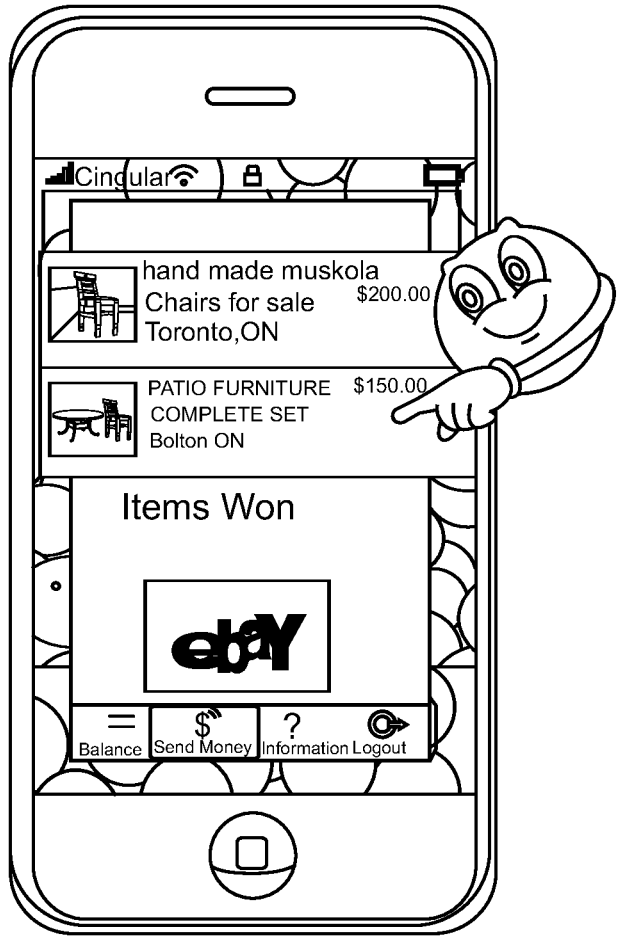

FIG. 6A shows a display the recipient sees after the user sends money, such as from FIG. 3A. In the display, the recipient, on a recipient device, such as a smart phone, sees a five dollar bill and a quarter, which may appear in various ways, including with sound, as discussed earlier. The display also shows a total, in this case $5.25, and currency type. A button is shown that the recipient can select to accept the money from the user. FIG. 6B shows a display the recipient sees after the user sends a product listing or items, such as from FIG. 3B.

Figure 7:
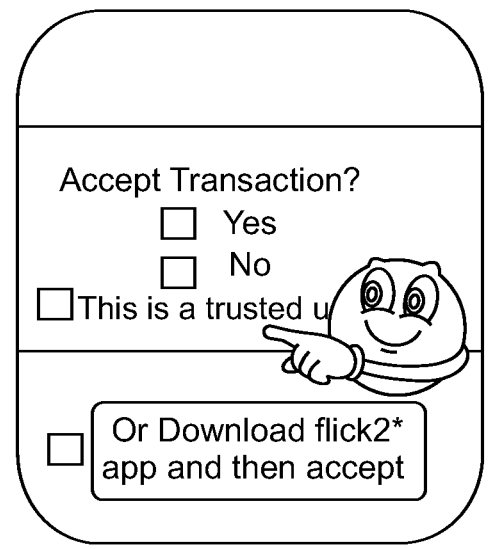

FIG. 7 shows a display in which the recipient can accept the transaction or action from the user, similar to the user display screen in FIG. 5. The recipient can accept or decline the transaction or add the recipient as a trusted contact. The recipient may also download the application and accept the transaction from this display. Note that this display may be shown before or after the display in FIGS. 6A and/or 6B.

Figure 8:
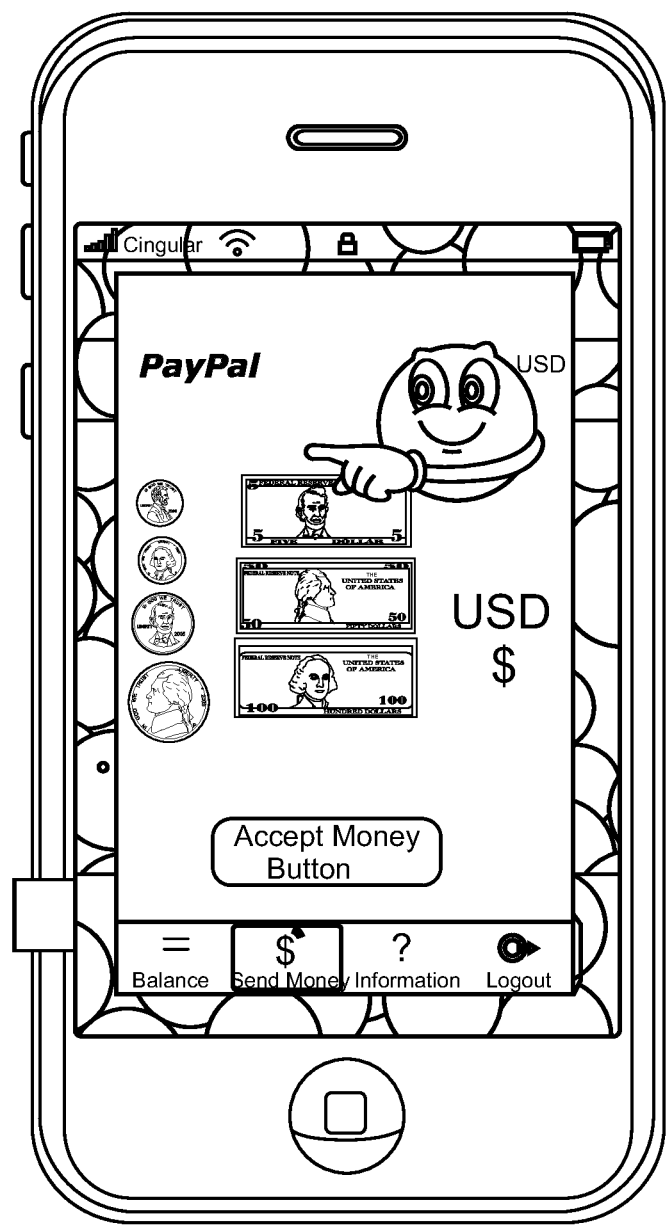

FIG. 8 shows a display in which the user receives an item or listing, such as in FIG. 6B, and can then pay using the same flicking actions. If the item was $105.12, the recipient may flick the hundred dollar bill, the five dollar bill, the dime, and the penny twice, in any order. If the recipient is still connected to the user or sender, the recipient may not need to select the recipient, but can simply flick the desired money for payment.

Figure 9A:

FIG. 9A shows a display in which the user is requesting a payment from the recipient. Here, the user sees bills and coins in the desired currency, with a "Send Money" button highlighted or selected. The user can then simply flick the desired bills and/or coins to the intended recipient. In one embodiment, the total requested is also displayed on the screen. Once received, the recipient can see the amount of money requested and make a payment through a typical payment process through a payment provider or by flicking a corresponding amount of bills and/or coins.

Figure 9B:

FIG. 9B shows a display in which the user is requesting the recipient purchase an item. The user can send the item to one or more recipients by first selecting the item and then flicking it or by just flicking the item. One or more intended recipients may be selected as discussed herein. Once received, the recipient may purchase the item through a typical payment process or by flicking, a discussed herein.

Figure 10:
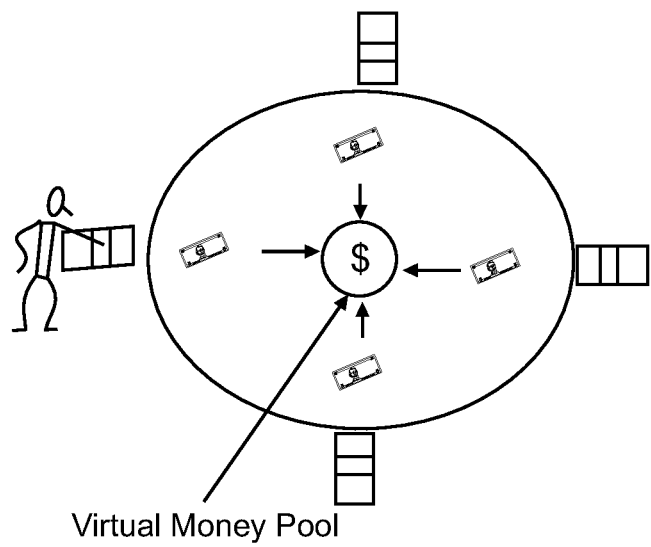

FIG. 10 shows a display for a use case where virtual currency is transferred or sent. In this example, the setting is a poker game between four users, who may all be trusted. The user of the device is identified with a figure of a person, although any other identifier may be used. When the user wishes to contribute to the pot, the user may simply flick the virtual currency to the middle of the table. The user may also transfer virtual currency to others at the table, such as by flicking currency to the desired destination. The user may also see others flicking virtual currency into the pot and to other players. This is just an example of using flick to move virtual currency. The type of virtual currency can be automatically shown when the user accesses an application or site using virtual currency.

FIGS. 11A to 11D show displays a user may see settings for the flick feature and how to customize the feature as well as invite others to be a trusted contact. In FIG. 11A, the user is presented with a list of questions to answer or settings to select. This may be on the actual user device, such as a smart phone, or on another user device, such as a PC, where the user can register for the feature. The questions and requests allow the user to customize the experience.

FIG. 11B shows a display after the user has clicked on "Click to Configure Partners" from the display of FIG. 11A. This screen allows the user to see current settings and change or configure as desired. Here, the user can see devices discovered or available to the user, along with the type of connection. The user can select a desired recipient to send that recipient a request.

FIG. 11C shows a display from the device of the selected recipient. The display includes a message from the user, along with options the recipient can select. In an "Accept" portion, the recipient can select all or just specific types of flicking actions to accept. Other portions allow the user to ignore the request or download an application to give the recipient the ability to use the flick feature on the recipient device. FIG. 11D shows a display when the recipient accepts the request and is successful. In one embodiment, only trusted parties can communicate with the flick feature, such that parties need to set up a trust, e.g., as shown above. However, in other embodiments, a one-time user or recipient can accept an action without setting up a trust relationship, even though this may be construed as a one-time trust relationship.

Figure 12:
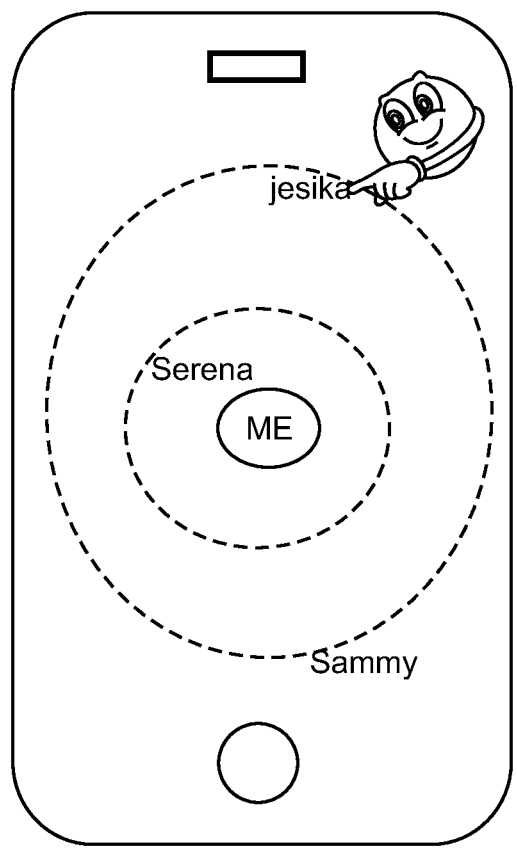

FIG. 12 shows a display where the user's trusted contacts are always available, such as by accessing the flick application. The display shows the user at the center, with trusted recipients on the screen. After selecting a desired trusted recipients, the user may initiate an action, such as making a payment. This "always on" mode is one of the settings the user can choose, as shown in FIG. 11A. In another embodiment, the user has the option of selecting multiple users from different lists, such as within a circle of trust, and sending the same item or items to all selected users with a single flick or action.

Thus, as seen, flicking or other similar motions can make electronic transactions fun and easy for both a user and a recipient. Use cases are virtually unlimited. In addition to the above, a user may use flicking to collect money from several recipients, such as a soccer mom collecting money for snacks or the Red Cross collecting money at a charity event. Unmanned kiosks or other machines can receive money from users flicking to make a payment, such as a purchase of tickets or other dispensable items. Flicking can also transfer coupons or other value items.

Figure 13:
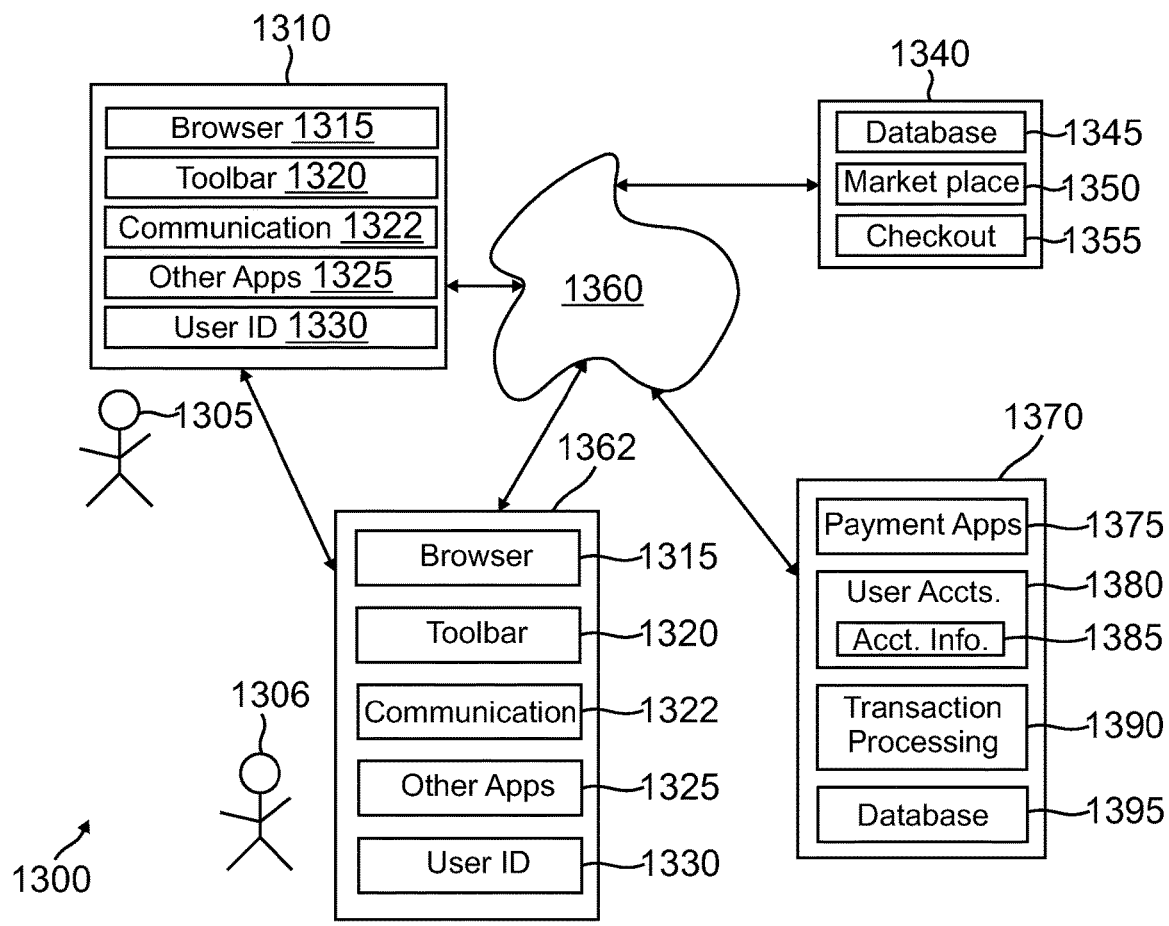
FIG. 13 is block diagram of a networked system suitable for implementing the process of FIGS. 1-12 according to an embodiment of the invention.

FIG. 13 is a block diagram of a networked system 1300 configured to handle a financial transaction between a user and a recipient, such as described above, in accordance with an embodiment of the invention. System 1300 includes a first user device 1310, a second user device 1362, a merchant server 1340, and a service provider server 1370 in communication over a network 1360. Service provider server 1370 may be maintained by a payment provider, such as PayPal, Inc. of San Jose, Calif., or an online market place provider, such as eBay, Inc. of San Jose, Calif. A first user 1305, such as a sender person or merchant, utilizes first user device 1310, and a second user 1306, such as a recipient person or merchant, utilizes and second user device 1362 for performing a transaction with a service provider.

First user device 1310, second user device 1362, merchant server 1340, and service provider server 1370 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 1300, and/or accessible over network 1360.

Network 1360 may be implemented as a single network or a combination of multiple networks. For example, in various embodiments, network 1360 may include the Internet or one or more intranets, landline networks, wireless networks, and/or other appropriate types of networks.

First user device 1310 and second user device 1362 may be implemented using any appropriate hardware and software configured for wired and/or wireless communication over network 1360. For example, in one embodiment, the two user devices may be implemented as a personal computer (PC), a smart phone, personal digital assistant (PDA), laptop computer, and/or other types of computing devices capable of transmitting and/or receiving data, such as an iPad™ from Apple™.

First user device 1310 may include one or more browser applications 1315 which may be used, for example, to provide a convenient interface to permit first user 1305 to browse information available over network 1360. For example, in one embodiment, browser application 1315 may be implemented as a web browser configured to view information available over the Internet. First user device 1310 may also include one or more toolbar applications 1320 which may be used, for example, to provide client-side processing for performing desired tasks in response to operations selected by first user 1305. In one embodiment, toolbar application 1320 may display a user interface in connection with browser application 1315 as further described herein.

First user device 1310 may further include other applications 1325 as may be desired in particular embodiments to provide desired features to first user device 1310. For example, other applications 1325 may include security applications for implementing client-side security features, programmatic client applications for interfacing with appropriate application programming interfaces (APIs) over network 1360, or other types of applications. Applications 1325 may also include email, texting, voice and IM applications that allow first user 1305 to communicate through network 1360. Applications 1325 may also include applications that display items for flicking, process a flicking motion on an item, and animate a transmission or reception of a flicked item.

First user device 1310 includes one or more user identifiers 1330 which may be implemented, for example, as operating system registry entries, cookies associated with browser application 1315, identifiers associated with hardware of first user device 1310, or other appropriate identifiers, such as used for payment/user/device authentication. In one embodiment, user identifier 1330 may be used by a service provider to associate first user 1305 with a particular account maintained by the service provider as further described herein. A communications application 1322, with associated interfaces, enables first user device 1310 to communicate within system 1300.

Second user device 1362 may have similar applications and modules as first user device 1310, but is used, in this example, for receiving money or other items from first user 1305. Second user device 1362 may also include one or more browser applications 1315 and one or more toolbar applications 1320 which may be used, for example, to provide a convenient interface to permit second user 406 to browse information and perform tasks over network 1360. For example, in one embodiment, browser application 1315 may be implemented as a web browser configured to view information available over the Internet and communicate with merchant server 1340 to receive and send information about purchases made through merchant server 1340.

Second user device 1362 may further include other applications 1325 such as security applications for implementing client-side security features, programmatic client applications for interfacing with appropriate application programming interfaces (APIs) over network 1360, or other types of applications. Applications 1325 may also include email, text, IM, and voice applications that allow second user 1306 to communicate through network 1360 and receive items and money through network 1360. Second user device 1362 includes one or more user identifiers 1330 which may be implemented, for example, as operating system registry entries, cookies associated with browser application 1315, identifiers associated with hardware of second user device 1362, or other appropriate identifiers, such as used for payment/user/device authentication, e.g., the phone number associated with second user device 1362. Identifiers may be used by a service provider to associate second user 1306 with a particular account maintained by the service provider.

Merchant server 1340 may be maintained, for example, by an on-line merchant offering various products and/or services in exchange for payment to be received over network 1360. Merchant server 1340 includes a database 1345 identifying available products and/or services (e.g., collectively referred to as items) which may be made available for viewing and purchase by first user 1305. Accordingly, merchant server 1340 also includes a marketplace application 1350 which may be configured to serve information over network 1360 to browser 1315 of first user device 1310 and second user device 1362. In one embodiment, first user 1305 may interact with marketplace application 1350 through browser applications over network 1360 in order to view various products or services identified in database 1345.

Merchant server 1340 also includes a checkout application 1355 which may be configured to facilitate the purchase by first user 1305 of goods or services identified by marketplace application 1350. Checkout application 1355 may be configured to accept payment information from first user 1305 through service provider server 1370 over network 1360. For example, checkout application 1355 may receive and process a payment confirmation from service provider server 1370, as well as transmit transaction information to the service provider and receive information from the payment provider (e.g., a transaction ID). Checkout application 1355 may also enable payment through second user device 1362 in communication with the service provider by using a payment link as described herein.

Service provider server 1370 may be maintained, for example, by an online payment service provider which may provide payment or transmission of information between first user 1305, second user 1306, and the operator of merchant server 1340. In this regard, service provider server 1370 includes one or more payment applications 1375 which may be configured to interact with first user device 1310, second user device 1362, and/or merchant server 1340 over network 1360 to facilitate the purchase/transmission of goods or services by first user 1305 of first user device 1310 or payment between first user device 1310 and second user device 1362.

Service provider server 1370 also maintains a plurality of user accounts 1380, each of which may include account information 1385 associated with individual users. For example, account information 1385 may include private financial information of users of devices such as account numbers, passwords, device identifiers, user names, phone numbers, credit card information, bank information, or other financial information which may be used to facilitate online transactions by first user 1305. Advantageously, payment application 1375 may be configured to interact with merchant server 1340 on behalf of first user 1305 during a transaction with checkout application 1355 to track and manage purchases made by users.

A transaction processing application 1390, which may be part of payment application 1375 or separate, may be configured to receive information from a user device and/or merchant server 1340 for processing and storage in a payment database 1395. Transaction processing application 1390 may include one or more applications to process information from a payment or item transfer request from first user 1305 to either second user 1306 or a merchant associated with merchant server 1340. Other funding sources may also be processed through this application. Payment application 1375 may be further configured to determine the existence of accounts for first user 1305 and/or second user 1306, as well as create new accounts if necessary.

Figure 14:
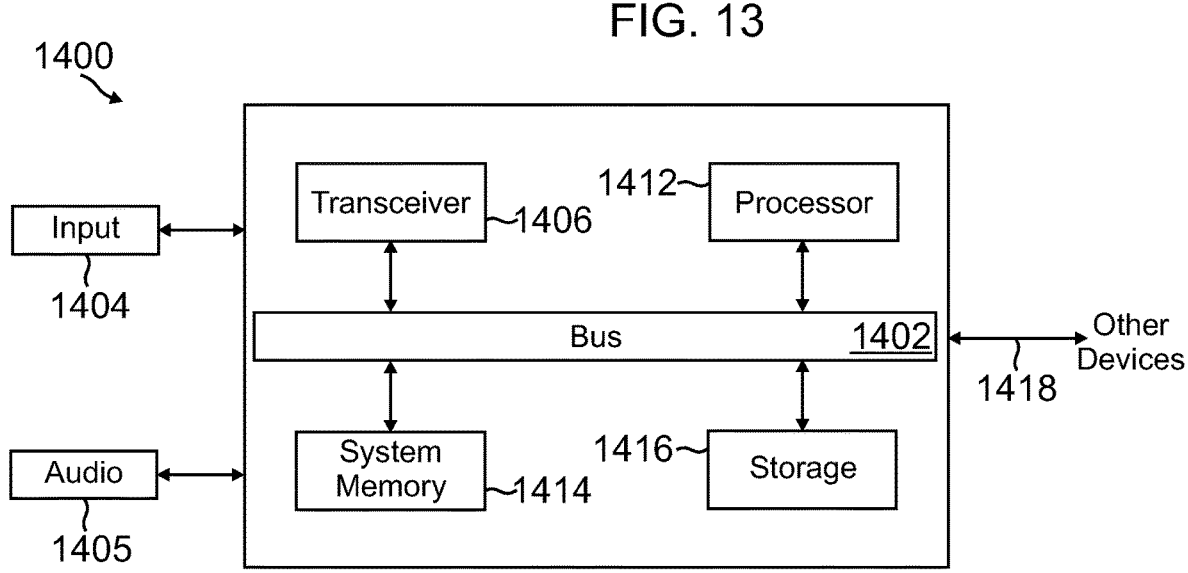
FIG. 14 is a block diagram of a computer system suitable for implementing one or more components in FIG. 13 according to one embodiment of the present disclosure.

FIG. 14 is a block diagram of a computer system 1400 suitable for implementing one or more embodiments of the present disclosure. In various implementations, the user device may comprise a personal computing device (e.g., a personal computer, laptop, smart phone, PDA, Bluetooth device, iPad, badge, etc.) capable of communicating with the network. The merchant and/or payment provider may utilize a network computing device (e.g., a network server) capable of communicating with the network. It should be appreciated that each of the devices utilized by users, merchants, and payment providers may be implemented as computer system 1400 in a manner as follows.

Computer system 1400 includes a bus 1402 or other communication mechanism for communicating information data, signals, and information between various components of computer system 1400. Components include an input/output (I/O) component 1404 that processes a user action, such as recognizing a flicking or other motion movement, selecting keys from a keypad/keyboard, selecting one or more buttons or links on a display, etc., and sends a corresponding signal to bus 1402. Other inputting means may also be suitable, such as stylus, video, multimedia, etc. I/O component 1404 may also include an output component, such as a display, which may be interactive. An optional audio input/output component 1405 may also be included to allow a user to hear audio, such as corresponding to flicking actions. A transceiver 1406 transmits and receives signals between computer system 1400 and other devices, such as another user device, a merchant server, or a service provider server. In one embodiment, the transmission is wireless, although other transmission mediums and methods may also be suitable. A processor 1412, which can be a micro-controller, digital signal processor (DSP), or other processing component, processes these various signals, such as for display on computer system 1400 or transmission to other devices via a communication link 1418. Processor 1412 may also control transmission of information, such as cookies or IP addresses, to other devices.

Components of computer system 1400 also include a system memory component 1414 (e.g., RAM) and a static storage component 1416 (e.g., ROM). Computer system 1400 performs specific operations by processor 1412 and other components by executing one or more sequences of instructions contained in system memory component 1414. Logic may be encoded in a computer readable medium, which may refer to any medium that participates in providing instructions to processor 1412 for execution. Such a medium may take many forms, including but not limited to, non-volatile media, volatile media, and transmission media. In various implementations, non-volatile media includes optical or magnetic disks, volatile media includes dynamic memory, such as system memory component 1414, and transmission media includes coaxial cables, copper wire, and fiber optics, including wires that comprise bus 1402. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 1400. In various other embodiments of the present disclosure, a plurality of computer systems 500 coupled by communication link 1418 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above focused on the user "flicking" an item. However, the user may perform another suitable action on the item to send it to a recipient, such as by tapping the item. "Flicking" can encompass any such or similar action. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A user device system, comprising:
   a non-transitory memory storing a list of potential recipients and a list of items; and
   one or more hardware processors coupled to the non-transitory memory and configured to read instructions to cause the user device system to perform operations comprising:
   receiving, from a first user of a transaction service provider system, a selection of one or more recipients from the list of potential recipients displayed via a user interface on a display of the user device system;
   displaying, via the user interface, a set of images representing at least some of the list of items that the first user can offer to a second user, each image representing a respective item;

detecting a first flick, performed by the first user through the user interface, of a first image of the set of images;

processing the detected first flick as a first request by the first user to offer a first item represented by the first image to the second user;

detecting a second flick, performed by the first user through the user interface, of a second image of the set of images;

processing the detected second flick as a second request by the first user to offer a second item represented by the second image to the second user;

causing, in response to the detecting of the first flick or the detecting of the second flick, the user interface to show an animation illustrating the first image or the second image leaving the display of the user device system; and transmitting the first request and the second request to the transaction service provider system over a network.

2. The user device system of claim 1, wherein the operations further comprise requesting a confirmation from the first user that the first user is requesting to offer the first item and the second item to the second user; and receiving the confirmation from the first user prior to transmitting the first request and the second request to the transaction service provider system of the network.

3. The user device system of claim 1, wherein the list of items comprises denominations of a currency and the set of images comprises images of bills and/or coins associated with the currency.

4. The user device system of claim 3, wherein a type of the currency is based on a location of the user device system when the set of images are displayed in the display of the user device system.

5. The user device system of claim 3, wherein the operations further comprise:

summing the denominations of currency associated with the first image and the second image to generate a total amount of money; and receiving a confirmation from the first user that the first user would like to offer the total amount of money to the second user.

6. The user device system of claim 1, wherein the list of items includes products or services that the first user can offer to the second user for purchase by the second user.

7. The user device system of claim 1, wherein the list of items includes products listed on an online marketplace by the first user.

8. The user device system of claim 1, wherein the operations further comprise: causing, in response to the detected first flick or the detected second flick, the user interface to play a sound of coins jingling or bills rustling.

9. The user device system of claim 1, wherein the operations further comprise:

displaying a confirmation interface in the display of the user device system, the confirmation interface providing one or more interface elements whereby the first user can confirm the request and can designate the selected one or more recipients as trusted recipients prior to transmitting the request to the transaction service provider system; and receiving an input from the first user confirming the request and designating at least one of the one or more recipients as trusted recipients.

10. A non-transitory machine-readable medium having stored thereon machine-readable instructions executable to cause a machine to perform operations comprising:

receiving, from a first user of a transaction service provider system, a selection of one or more recipients from a list of potential recipients displayed on a user interface of a first user device;

displaying, via the user interface, a set of images representing at least some of a list of items that the first user can offer to a second user, each image representing a respective item;

detecting a first flick, performed by the first user through the user interface, of a first image of the set of images;

processing the detected first flick as a first request by the first user to offer a first item represented by the first image to the second user;

detecting a second flick, performed by the first user through the user interface, of a second image of the set of images;

processing the detected second flick as a second request by the first user to offer a second item represented by the second image to the second user;

causing, in response to the detecting of the first flick or the detecting of the second flick, the user interface to illustrate a disappearance of the first image or the second image from the user device; and transmitting the first request and the second request to the transaction service provider system over a network.

11. The non-transitory machine-readable medium of claim 10, wherein the list of items comprises denominations of a currency and the set of images comprises images of bills and/or coins associated with the currency.

12. The non-transitory machine-readable medium of claim 11, wherein the operations further comprise:

summing the denominations of currency associated with the first image and the second image to generate a total amount of money; and receiving a confirmation from the first user that the first user would like to offer the total amount of money to the second user.

13. The non-transitory machine-readable medium of claim 10, wherein the list of items includes products or services, listed in an online marketplace, that the first user can offer to the second user for purchase by the second user.

14. The non-transitory machine-readable medium of claim 10, wherein the request by the first user to offer the first item to the second user comprises an offer to sell the first item to the second user.

15. The non-transitory machine-readable medium of claim 10, wherein the operations further comprise:

displaying a confirmation interface via the user interface of the first user device, the confirmation interface providing one or more interface elements whereby the first user can confirm the request and can designate the selected one or more recipients as trusted recipients prior to transmitting the request to the transaction service provider system; and receiving an input from the first user confirming the request and designating at least one of the one or more recipients as trusted recipients.

16. A method comprising:

displaying a user interface in a display of a first user device, the user interface including first user interface elements prompting a first user to accept or decline to receive an offer from a second user;

receiving, via the first user device, the offer from the second user, wherein the offer from the second user comprises an image of an offered item, and wherein the offered item is a product or service that the second user wants to sell to the first user;

receiving a command from the first user to accept the offer;

displaying, via the user interface, a set of images representing different denominations of currency;

detecting a first flick, performed by the first user through the user interface, of a first image of the set of images;

detecting a second flick, performed by the first user through the user interface, of a second image of the set of images;

processing the detected first flick and second flick as a request by the first user to provide payment for the offered item to the second user;

animating, in response to the detecting of the first flick and the detecting of the second flick, a flicked first image corresponding to a first denomination of currency and a flicked second image corresponding to a second denomination of currency to move toward an edge of the display and disappear; and transmitting the request to a transaction service provider system over a network to transfer a payment amount from an account of the first user to an account of the second user, the payment amount being equal to a sum of the first denomination of currency corresponding to the first image and the second denomination of currency corresponding to the second image.

17. The method of claim 16, wherein receiving the command from the first user to accept the offer comprises receiving an indication that the second user is a trusted contact of the first user.

18. The method of claim 16, wherein receiving the command from the first user to accept the offer comprises a request to download an application whereby the first user can accept the offer, such that the application displays the image of the offered item in the display of the first user device.

19. The method of claim 16, further comprising animating, in response to the detecting of the first flick and the detecting of the second flick, the user interface to play a sound of coins jingling or bills rustling.

20. The non-transitory machine-readable medium of claim 10, wherein the operations further comprise: causing, in response to the detected first flick or the detected second flick, the user interface to animate the first image or the second image leaving the user interface of the first user device.

* * * * *